United States Patent
Buhl

(10) Patent No.: US 12,516,518 B2
(45) Date of Patent: Jan. 6, 2026

(54) WALL, CEILING OR ROOF ELEMENT CONNECTION

(71) Applicant: Stefan Buhl, Obermaiselstein (DE)

(72) Inventor: Stefan Buhl, Obermaiselstein (DE)

( * ) Notice: Subject to any disclaimer, the term of this patent is extended or adjusted under 35 U.S.C. 154(b) by 370 days.

(21) Appl. No.: 18/271,514

(22) PCT Filed: Dec. 21, 2021

(86) PCT No.: PCT/EP2021/086985
§ 371 (c)(1),
(2) Date: Jul. 10, 2023

(87) PCT Pub. No.: WO2022/152523
PCT Pub. Date: Jul. 21, 2022

(65) Prior Publication Data
US 2024/0309630 A1    Sep. 19, 2024

(30) Foreign Application Priority Data

Jan. 12, 2021  (DE) .................... 20 2021 100 095.3

(51) Int. Cl.
*E04B 1/26*    (2006.01)
(52) U.S. Cl.
CPC .... *E04B 1/2604* (2013.01); *E04B 2001/2628* (2013.01)
(58) Field of Classification Search
CPC .......... E04B 1/2604; E04B 2001/2628; E04B 2001/2632; F16B 2200/30; F16B 5/0052; F16B 5/0036
See application file for complete search history.

(56) References Cited

U.S. PATENT DOCUMENTS

| 4,981,388 A * | 1/1991 | Becken ................. F16B 37/047 403/258 |
| 5,799,452 A | 9/1998 | Moore |
| 7,124,544 B2 * | 10/2006 | Brown ..................... E04B 5/12 52/611 |

(Continued)

FOREIGN PATENT DOCUMENTS

| AT | 505626 A4 | 3/2009 |
| DE | 3015934 A1 | 10/1981 |
| WO | 2020051606 A1 | 3/2020 |

OTHER PUBLICATIONS

International Preliminary Report on Patentability for PCT/EP2021/086985 filed Dec. 21, 2021.

(Continued)

*Primary Examiner* — Rodney Mintz
(74) *Attorney, Agent, or Firm* — Fleit Intellectual Property Law; Paul D. Bianco

(57) ABSTRACT

A wall, ceiling or roof element connection for connecting bar shaped, beam shaped or panel shaped wooden components includes a pin arranged on the first wooden component and has an outer contour widening in the direction of the second wooden component, and a recess or notch arranged directly on the second wooden component and having an insertion section for insertion of the pin and a holding section having an inwardly widening inner contour adapted to the outer contour of the pin for holding the pin. The pin is attached to the first wooden component via a detachable connection.

9 Claims, 3 Drawing Sheets

(56) References Cited

U.S. PATENT DOCUMENTS

| | | | |
|---|---|---|---|
| 7,811,024 B2* | 10/2010 | Vendetti | F41G 11/003 403/381 |
| 8,371,080 B2 | 2/2013 | Wrightman | |
| 10,138,917 B2* | 11/2018 | Koch | F16B 5/01 |
| 2003/0159367 A1* | 8/2003 | Brown | E04B 5/12 52/79.1 |
| 2003/0175075 A1* | 9/2003 | Garrison | B23Q 16/08 403/381 |
| 2006/0233605 A1* | 10/2006 | Vendetti | F41G 11/003 403/381 |
| 2009/0056251 A1* | 3/2009 | Wrightman | E04B 2/705 29/428 |
| 2014/0294498 A1 | 10/2014 | Logan | |
| 2015/0354612 A1 | 12/2015 | Koch | |

OTHER PUBLICATIONS

International Search Report dated Apr. 6, 2022 with Written Opinion for International Application No. PCT/EP2021/086985 filed Dec. 21, 2021.

Search Result of German Patent Application 20 2021 100 095.3 filed Jan. 12, 2021.

* cited by examiner

WALL, CEILING OR ROOF ELEMENT CONNECTION

FIELD OF THE INVENTION

The invention relates to a wall, ceiling or roof element connection for connecting bar-shaped, beam-shaped or plate-shaped structural elements.

BACKGROUND

For the connection of wall, ceiling or roof elements, special metal connectors or classic wood connections with e.g. finger or dovetail galvanizing without metallic connecting elements are often used in wood construction. In the case of conventional dovetail joints, a pin with a specially shaped outer contour is usually milled or cut out on one component. On the second component, a corresponding groove is produced with an inner contour corresponding to the outer contour of the pin. The lateral exterior surfaces of the pin and the corresponding inner side surfaces of the groove are generally chamfered, so that the pin and the groove have a dovetail shape in cross-section. As a result, such a connection can transmit not only transverse forces but also tensile forces. However, the production of such a connection involves a correspondingly high production expenditure. In addition, a relatively large amount of material would have to be removed to make the pins when connecting large-area components so that the pin remains. Metal connectors also tend to be laborious to fabricate and require accurate pre-assembly. In addition, in the case of wall fastening, the insertion with such metal connectors is relatively difficult, because the clearance is very small.

SUMMARY OF THE INVENTION

One aspect of the invention relates to create a wall, ceiling or roof element connection, which enables a simple and cost-effective connection of even large-area construction elements.

Useful further developments and advantageous embodiments of the invention are disclosed herein.

In an embodiment, the wall, ceiling or roof element connection according to the invention comprises a pin arranged on a first wooden component and having an outer contour widening in the direction of the second component, and a recess or groove provided on a second wooden component and having an insertion section for inserting the pin and a holding section with an inner contour adapted to the outer contour of the pin and widening inwards for holding the pin. The pin, which is formed as a separate component, is secured to the first component by a detachable connection, e.g. configured as a screw or pin connection. The recess or groove associated with the pin is arranged directly in the second wooden component. It may, for example, be milled directly into the second wooden component. Via the detachable connection, the pins can, for example, be mounted easily and quickly at any desired locations. No complex manufacturing or assembly steps are required. For example, corresponding pins can also be relatively easily attached to the end or side surfaces of large wall components at the desired locations. This can considerably simplify the assembly of large-format components, such as wall, ceiling or roof elements made of wood. Compared with known metal connectors, the wall, ceiling or roof element connection according to the invention also offers improved freedom of movement. When attaching the connection, the components can be aligned and adjusted even more easily, making assembly considerably easier. Both the pin and the corresponding recess or groove can be manufactured easily and inexpensively, providing an economical connection with significant time savings during assembly.

In a particularly practical embodiment, the detachable connection can be designed, for example, as a screw or pin connection with one or more screws, studs or other similar fastening elements. The pins can be easily and quickly mounted at any position using the screws or corresponding fastening elements and can also be relocated or readjusted if required.

According to one possible embodiment of the invention, the pin has a cross-section widening from an inner connection surface facing the first wooden component to an outer front surface facing the second wooden component, and the holding section of the recess or groove has a cross-section widening inwards from a front exterior surface of the second wooden component. Such a contour also allows tensile forces to be transmitted with high stability.

In order to achieve a secure and precisely positioned connection between the pin and the first wooden component, an elevation, e.g. in the form of a feather key, can be provided on the inner connection surface of the pin facing the first wooden component for positive engagement in a corresponding depression on the first wooden component.

The wall, ceiling or roof element connection can be designed as a dovetail connection with inclined outer side surfaces on the pin and correspondingly inclined inner side surfaces in the recess or groove. In a particularly stable and load-bearing design, the pin may be in the form of a wedge tapering in the insertion direction. However, the pin may also be in the form of a truncated cone or in the form of a block-shaped insertion member of uniform cross-section.

In another possible embodiment, the wall, ceiling or roof element connection can also be designed as a T-connection with a T-slot and an associated pin with a T-shaped cross-section.

The side surfaces of the recess or groove and also the exterior surfaces of the pin expediently extend toward each other in a wedge shape in the insertion direction of the pin. However, the pin and the recess or groove can also have a constant cross-section.

The pin can conveniently be made of wood, preferably laminated veneer lumber or hardwood, but it can also be made of plastic or metal.

BRIEF DESCRIPTION OF THE DRAWINGS

Further features and advantages of the invention will be apparent from the following description of a preferred embodiment based on the drawing. It shows.

DETAILED DESCRIPTION

Figure 1:
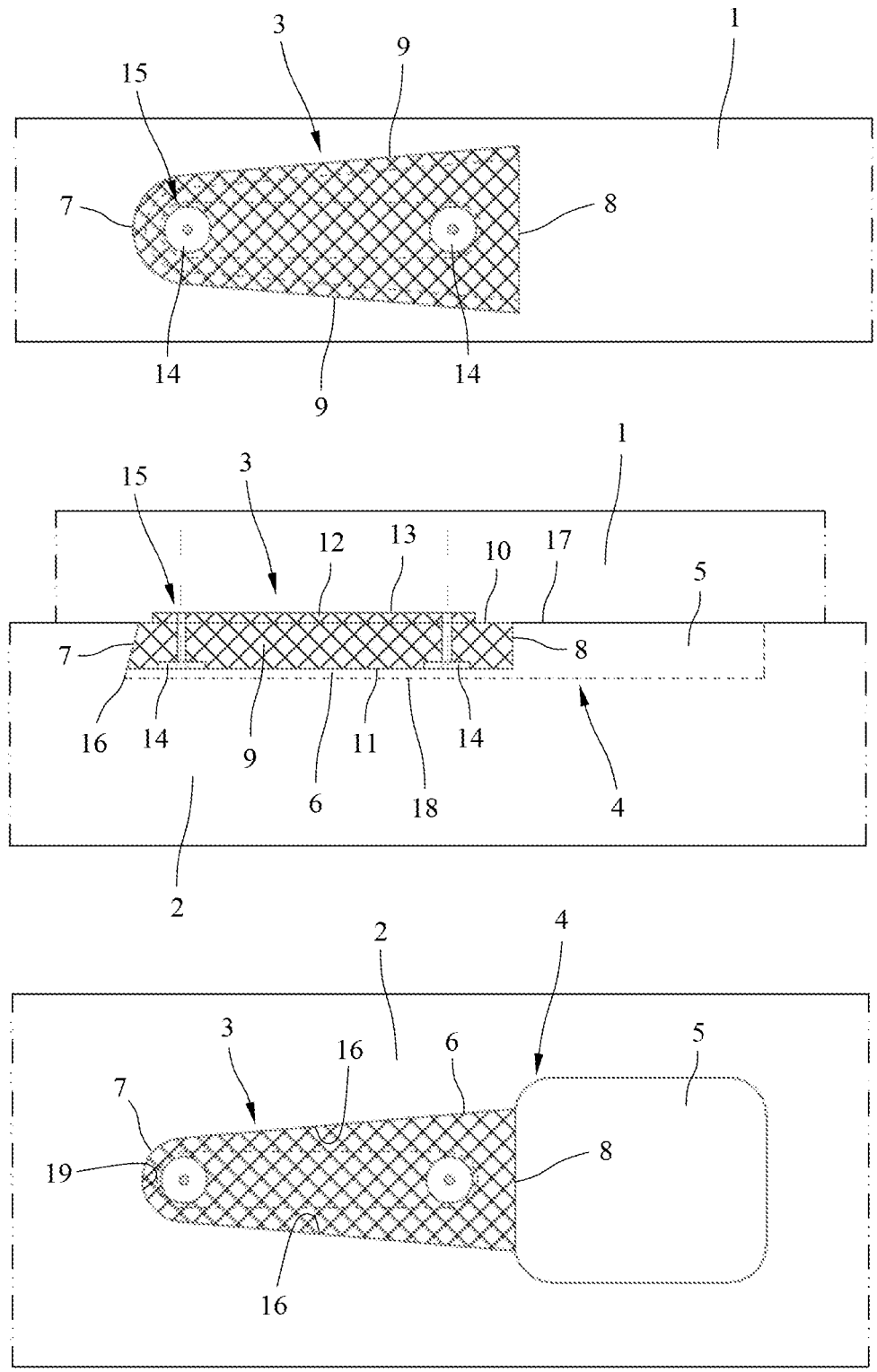
FIG. 1 a first embodiment of a wall, ceiling or roof element connection in a bottom view, sectional side view and top view.
Figure 2:
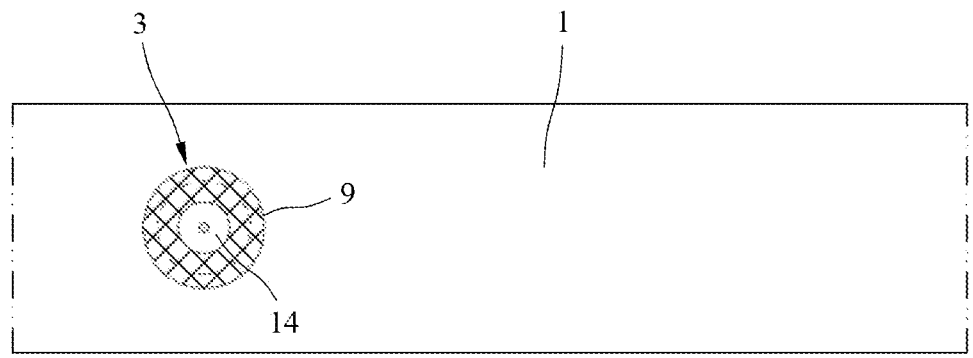
FIG. 2 a second embodiment of a wall, ceiling or roof element connection in a bottom view, sectional side view and top view and FIG. 3 a third embodiment of a wall, ceiling or roof element connection in various views.
Figure 2:
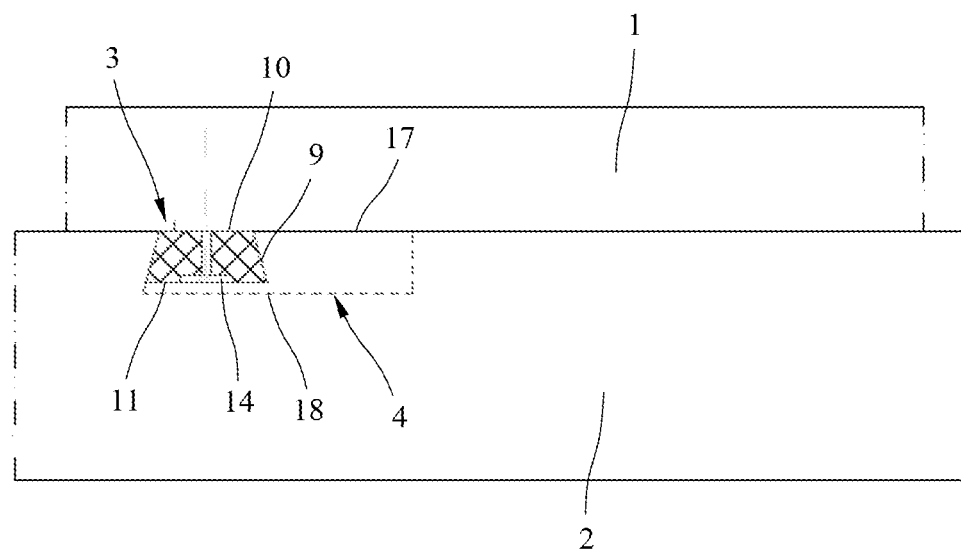
Figure 2:
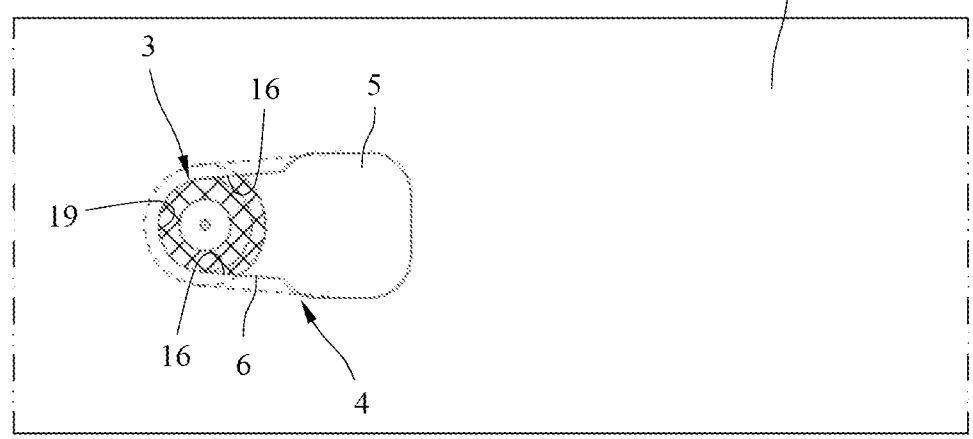
Figure 3:
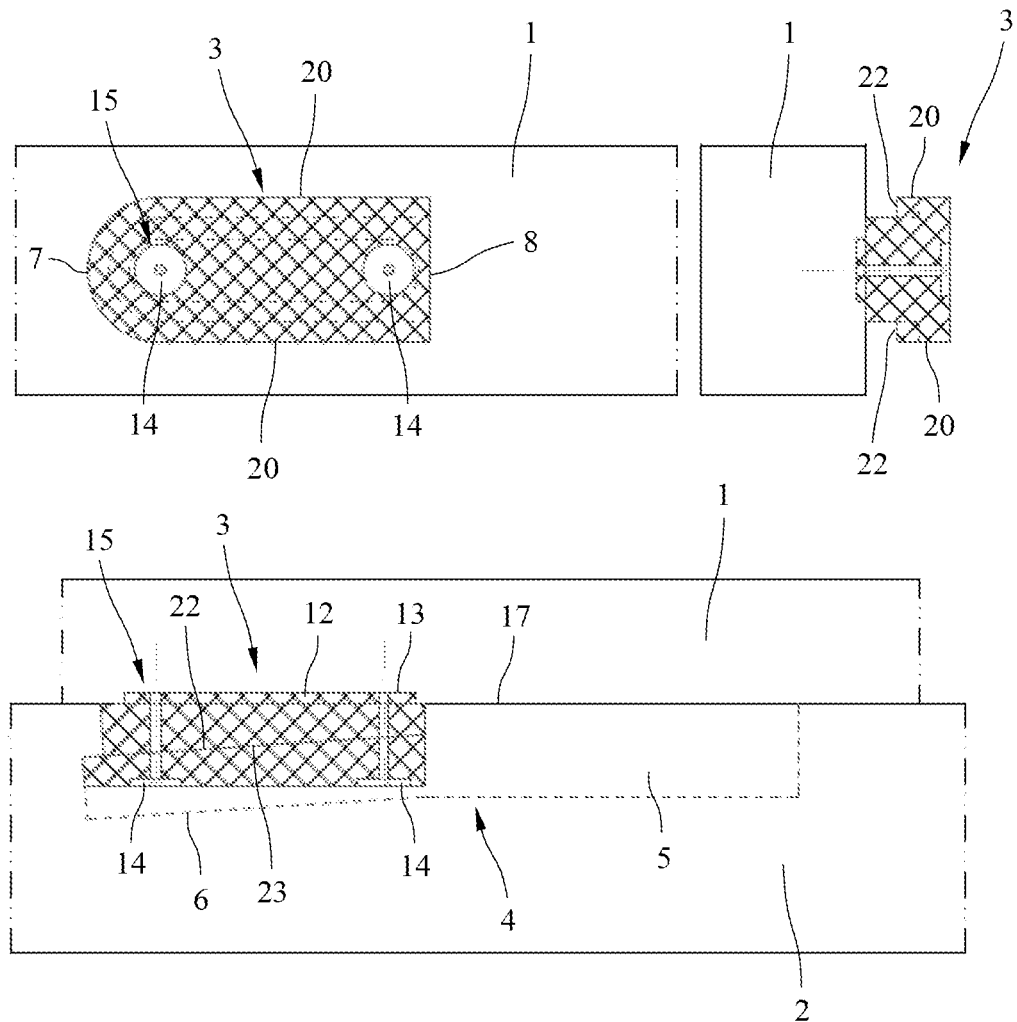
Figure 3:
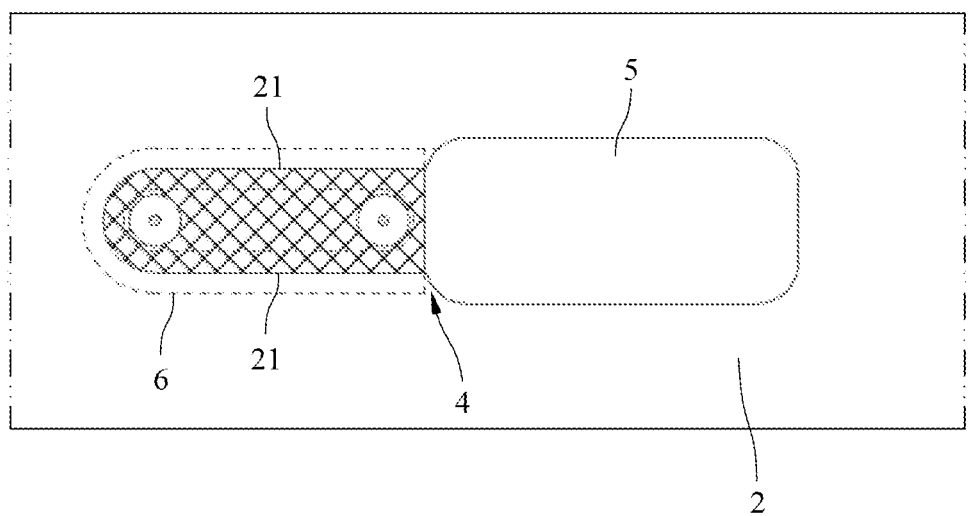

FIGS. 1 to 3 show various embodiments of a wall, ceiling or roof element connection for connecting, for example, beam- or panel-shaped wooden components 1 and 2 in different views. The wall, ceiling or roof element connection comprises a pin 3 arranged on the first wooden component 1 and having an outer contour widening in the direction of the second wooden component 2, and a recess or groove 4 provided on the second wooden component 2 and having an insertion section 5 for inserting the pin 3 and a holding section 6 having an inner contour adapted to the outer contour of the pin 3 and widening inwards for holding the pin 3.

In the embodiment shown in various views in FIG. 1, the pin 3 has a wedge shape tapering in the insertion direction with a trapezoidal cross-section. The pin 3 includes a slimmer front end surface 7 and a wider rear end surface 8 as viewed in the insertion direction, the front end surface 7 being rounded. The pin 3 also includes inclined outer side surfaces 9. The side surfaces 9 are inclined such that the pin 3 widens in cross-section in a trapezoidal shape from an inner connection surface 10 facing the component 1 to an outer front surface 11 facing the component 2. On its inner connection surface 10 facing the component 1, the pin 3 has an elevation 12 in the form of a feather key for positive engagement in a corresponding depression 13 in the component 1. The pin 3 is fastened to the component 1 by a detachable connection 15 designed here as a screw connection with several screws 14.

As can be seen in particular from the lower view of FIG. 1, the recess or groove 4 belonging to the pin 3 in the component 2 has a widened insertion section 5 and a slimmer holding section 6. The holding section 6 is designed in such a way that the inner side surfaces 16 of the recess or groove 4 in this section are inclined in such a way that the recess or groove 4 in the holding section 6 widens in cross-section from an end-side exterior surface 17 of the second component 2 to an inner bottom surface 18 in a trapezoidal shape. Also, in the holding section 4, the recess or groove 4 has a wedge-shaped taper corresponding to the shape of the pin 3 in the insertion direction of the pin 3, with a width decreasing from the insertion section 5 to a rounded inner end 19. The holding section 6 of the groove 4 can be produced, for example, with a dovetail cutter.

In another version of a wall, ceiling or roof element connection shown in FIG. 2, the pin 3 is in the form of a truncated cone which widens in the direction of the second wooden component 2 and has an outer side surface 9 which is conical in this case. The pin 3 formed as a truncated cone has an inner connection surface 10 facing the component 1 with a smaller diameter and an outer front surface 11 facing the component 2 with a larger diameter. The pin 3 formed as a truncated cone is attached to the first wooden component 1 via a single screw 14.

As can be seen from the lower view of FIG. 2, here too the recess or groove 4 in the component 2 belonging to the pin 3 contains a widened insertion section 5 and a slimmer holding section 6. The widened insertion section 5 has a greater width than the largest diameter of the pin 3. The holding section 6 is designed such that the inner side surfaces 16 of the groove 4 in this section are inclined such that the recess or groove 4 in the holding section 6 widens in cross-section from a front side exterior surface 17 of the second wooden component 2 to an inner bottom surface 18 in a trapezoidal shape. Again, the recess or groove 4 in the holding section 6 has a wedge-shaped taper in the insertion direction of the pin 3 with a width that decreases from the insertion section 5 to a rounded inner end 19. The holding section 6 of the recess or groove 4 can also be produced here, for example, with a suitable dovetail cutter.

FIG. 3 shows a further embodiment of a wall, ceiling or roof element connection according to the invention. In contrast to the previous embodiments, the outer side surfaces 9 of the pin 3, which is fastened to the first wooden component 1 by means of a detachable connection 15, and also the corresponding inner side surfaces 16 of the groove 4 do not converge in a wedge shape in the insertion direction of the pin 3; instead, the pin 3 and also the corresponding recess or groove 4 have a constant width over virtually their entire length. In this embodiment, too, however, the pin 3 has a cross-section widening from an inner connection surface 10 facing the first component 1 to an outer front surface 11 facing the second component and, correspondingly, the recess or groove 4 has a cross-section widening inwards from an end-face exterior surface 17 of the second wooden component 2.

The wall, ceiling or roof element connection shown in FIG. 3 is also not designed as a dovetail connection with inwardly inclined side surfaces, but as a T-connection with a pin 3 in the form of a T-nut and an associated recess or groove 4 with a holding section 6 in the form of a T-slot. The pin 3 has stepped outer side surfaces 20 and the recess or groove 4 has correspondingly stepped inner side surfaces 21 at the holding section 6. At the step of the outer side surfaces 20 of the pin 3, as viewed in the insertion direction of the pin 3, downwardly inclined bearing surfaces 22 are provided for abutment against correspondingly inclined bearing surfaces 23 at the step of the inner side surfaces 21. As a result, when the pin 3 is pushed into the holding section 6, an insertion force at right angles to the insertion direction is achieved. The inclined bearing surfaces 23 in the recess or groove 4 are arranged on the upper side of the holding section 6 of the groove 4, which extends obliquely downward. The holding section 6 can be produced by a T-slot cutter inclined with respect to the front exterior surface 17 of the second wooden component 2.

The pin 3 can preferably be made of laminated veneer lumber, but it can also be made of hardwood, plastic or metal.

LIST OF REFERENCE SIGNS

1 First wooden component
2 Second wooden component
3 Pin
4 Groove
5 Insertion section
6 Holding section
7 Front end surface
8 Rear end surface
9 Inclined outer side surface
10 Connection surface
11 Front surface
12 Elevation
13 Depression
14 Screw
15 Detachable connection
16 Inclined inner side surface
17 Exterior surface
18 Bottom surface
19 Inner end
20 Stepped outer side surface
21 Stepped inner side surface
22 Bearing surface
23 Bearing surface

The invention claimed is:

1. A wall, ceiling or roof element connection for connecting first and second bar-shaped, beam-shaped or plate-shaped wooden components, the wall, ceiling or roof element connection comprising:
a pin located on the first wooden component configured to be connected to the second wooden component, the pin having a cross-section with an outer contour widening from an inner connection surface facing the first wooden component to an outer front surface facing the second wooden component, and a recess or groove located directly on the second wooden component, the recess or groove having an insertion section configured for inserting the pin and a holding section having a cross-section with an inner contour configured to match the outer contour of the pin for holding the pin, the holding section widening inwards from an end-face exterior surface of the second wooden component,
wherein the pin is fastened to the first wooden component via a detachable screw or pin connection, and wherein on the inner connection surface of the pin facing the first wooden component, a protruding elevation is provided that is configured for positive engagement in a corresponding depression on the first wooden component.

2. The wall, ceiling or roof element connection according to claim 1, wherein the recess or groove is milled into the second wooden component.

3. The wall, ceiling or roof element connection according to claim 1, wherein the pin includes inclined outer side surfaces and an associated said recess or groove includes correspondingly inclined inner side surfaces.

4. The wall, ceiling or roof element connection according to claim 1, wherein the pin comprises a wedge tapering in the insertion direction.

5. The wall, ceiling or roof element connection according to claim 1, wherein the pin comprises a truncated cone.

6. The wall, ceiling or roof element connection according to claim 1, wherein the pin is made of wood, plastic or metal.

7. The wall, ceiling or roof element connection according to claim 1, wherein the pin has a T-shaped cross section and an associated said recess or groove comprises a T-slot.

8. The wall, ceiling or roof element connection according to claim 7, wherein the pin includes stepped outer side surfaces and the associated recess or groove includes correspondingly stepped inner side surfaces.

9. The wall, ceiling or roof element connection according to claim 8, wherein the pin, which comprises a T-nut, has inclined bearing surfaces for bearing against correspondingly inclined bearing surfaces inside the recess or groove.

* * * * *